Feb. 16, 1971  N. CODA ET AL  3,564,359

TUBULAR CAPACITOR

Filed Aug. 10, 1967

INVENTORS
Nello Coda
Lawrence J. Ruffner
BY Ralph Hammar
ATTORNEY

United States Patent Office 3,564,359
Patented Feb. 16, 1971

3,564,359
TUBULAR CAPACITOR
Nello Coda, Erie, and Lawrence J. Ruffner, College, Pa., assignors to Erie Technological Products, Inc., Erie, Pa., a corporation of Pennsylvania
Filed Aug. 10, 1967, Ser. No. 659,675
Int. Cl. H01g 1/06
U.S. Cl. 317—260                                    3 Claims

ABSTRACT OF THE DISCLOSURE

A tubular capacitor with a ground electrode spaced inward from the ends of the tube and with two other electrodes spaced from each other at the center of the tube and extending respectively toward opposite ends of the tube. The ground electrode is applied to a layer of green ceramic and the other two electrodes are applied to another layer of green ceramic and the layers of ceramic are arranged one on top of the other and spirally wrapped a plurality of turns about the axis of the tube. The spiralled turns of the ground electrode are shorted by conductive material in one or more holes through the ceramic between the two other electrodes.

---

This invention is a capacitor unit in the form of a wrapped ceramic capacitor with one electrode of each unit extending to one and the other end of the tube and with a common electrode spaced inward from the ends of the tube. The turns of the common electrode are shorted by conductive material in holes through the ceramic.

Figure 1:
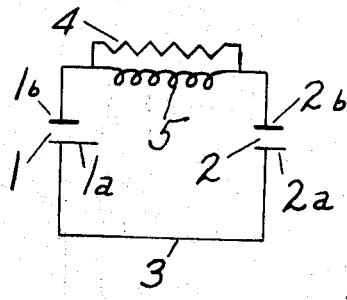
Figure 2:
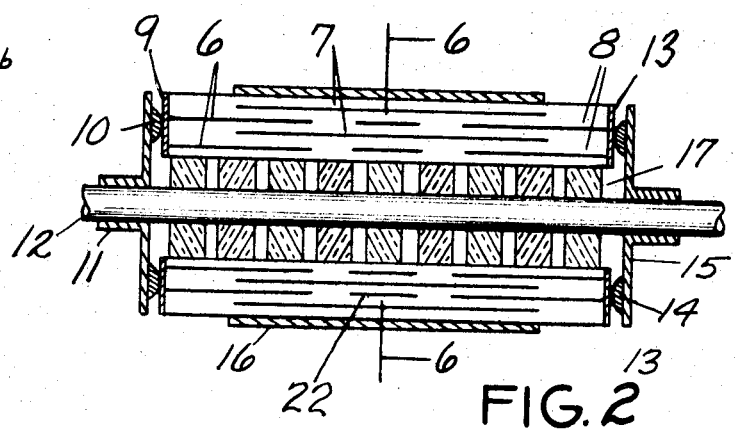
Figure 3:
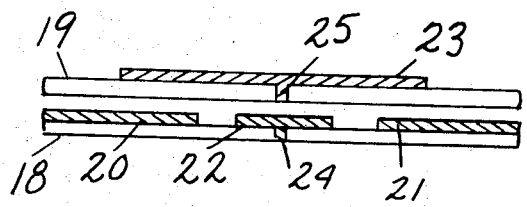
Figure 6:
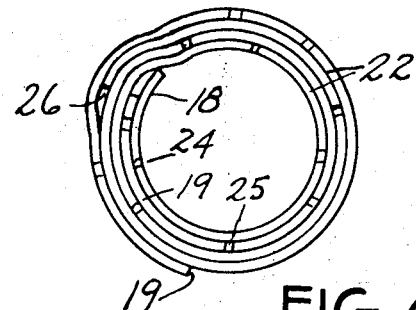
Figure 4:
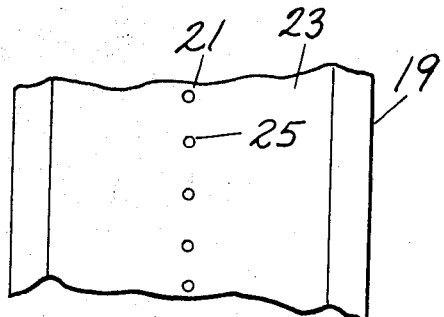
Figure 8:
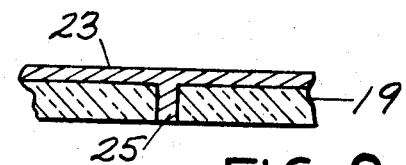
Figure 5:
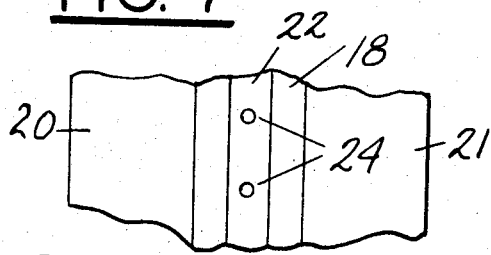
Figure 9:
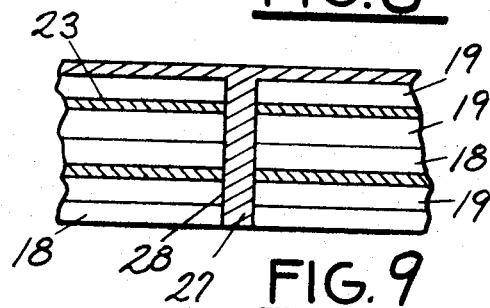
Figure 7:
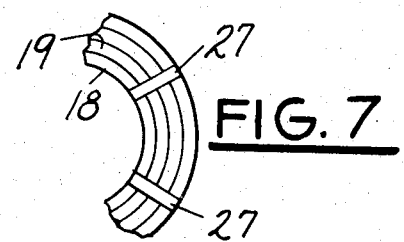

In the drawing, FIG. 1 is a circuit diagram of a filter unit, FIG. 2 is a longitudinal section through a filter unit, FIG. 3 is a diagrammatic sectional view showing two layers of electroded green ceramic positioned one on top of the other ready for wrapping, FIG. 4 is a fragmentary plan view of one of the layers of electroded green ceramic, FIG. 5 is a fragmentary top plan view of the other layer of electroded green ceramic, FIG. 6 is a section on line 6—6 of FIG. 2, FIG. 7 is a fragmentary section of a modification, FIG. 8 is a fragmentary view illustrating the flow of the metal paint through a hole in the dielectric layer, and FIG. 9 is a fragmentary sectional view showing a modification in which the hole through which the common electrode is shorted extends through a plurality of layers of ceramic.

In the filter of FIG. 1, there are capacitors 1 and 2 having electrodes 1a and 2a connected to a common ground 3 and having electrodes 1b and 2b across which are connected a resistance 4 and an inductance 5, or an impedance having both inductive and resistance properties. In some filters, a separate resistor or a separate inductance is used. In other filters, the combined effect of a resistor and an inductance is obtained by a ferrite.

In the filter shown in FIG. 2, the capacitor 1 comprises electrode 6 (corresponding to 1b) and the left hand side of common ground electrode 7 and capacitor 2 comprises electrode 8 (corresponding to 2b) and the right hand side of the common ground capacitor electrode 7. The electrode 7 corresponds to 1a, 3, 2a in FIG. 1. All of the electrodes 6, 7 and 8 are spiralled in a plurality of turns about the axis of the tube. The electrode 6 extends to one end of the tube and is shorted by a silver coating 9 and connected by solder 10 to a flange 11 on a wire 12 extending through the axis of the tube. Electrode 8 extends to the opposite end of the tube and is shorted by a silver coating 13 connected by solder 14 to a flange 15 on the wire 12. The common electrode 7 is connected to an outer metal coating 16. In use, the coating 16 is connected to ground and the filter chokes out or dissipates the high frequency currents flowing through the wire 12. In the particular filter illustrated, the effect of the resistor 4 and the inductance 5 is provided by ferrite beads 17 surrounding the wire 12. The electrodes 6 and 8 are shorted by the silver coatings 9 and 13 and accordingly do not introduce undesirable inductance. Without more, the electrode 7 would introduce undesirable inductance since the electrode 7 as well as the electrodes 6 and 8 are spiralled about the axis of the tube so that the current flowing to the ground coating 16 must flow around the axis of the tube. In order to prevent this unwanted inductive effect in electrode 7, the electrode 7 is shorted through holes in the dielectric. One construction for accomplishing this result is shown in FIGS. 3–6.

FIG. 3 is an edge view of two green or unfired ceramic layers 18, 19 arranged one on top of the other, the layer 19 being spaced slightly above the layer 18 for clarity of illustration. FIGS. 4 and 5 are plan views of the layers 19 and 18. The layer 18 (FIG. 5) is made of a suitable ceramic such as one of the high dielectric constant titanates and has applied to one surface an electrode 20 which ultimately will become electrode 6 and electrode 21 which ultimately will become electrode 8 and an intermediate electrode 22 which will assist in shorting the spiral turns of the electrode 7. Also, the intermediate electrode 22 acts as a grounded electrostatic shield between electrodes 20 and 21 which reduces the capacitive coupling between 20 and 21 (or between 6 and 8 or 1b and 2b) essentially to zero which improves the performance of the filter. The electrodes 20, 21 and 22 are applied in the form of a metal paint to the green ceramic. For the high dielectric constant titanates, the paint will be of a metal or alloy which will stand the high firing temperatures such as of the platinum-palladium family. The ceramic layer 19 (FIG. 4) has applied to one surface thereof an electrode 23 which ultimately becomes electrode 7. To assist in shorting the spiral turn of electrode 7, a plurality of spaced holes 24 in layer 18 are spaced along the center of the electrode 22 and a plurality of similar holes 25 in layer 19 are spaced along the center of the electrode 23. The holes 24 and 25 need not be of the same spacing. The spacing between the holes is such that there will be at least one hole in each turn of the finished capacitor. During application of the electrodes 22 and 23, the paint runs into the holes 24 and 25 and establishes a metallic connection through the holes. The holes 24 in layer 18 establish direct metallic connections between the electrode 22 and the turns of the ground electrode 23. The holes 25 in layer 19 establish direct metallic connections between the ground electrode 23 and the turns of electrode 22. Electrodes 22 and 23 thereby become non-inductive ground electrodes. The thickness of the dielectric and the size of the holes has been greatly exaggerated. The green ceramic layers can be as little as 2 to 3 mils in thickness and the holes 24 and 25 need be only pinpricks. The shape of the holes may be varied. The holes may be narrow slots. The holes are placed in the green ceramic prior to painting the electrodes and the metal paint quickly flows through the holes. The layers of films 18, 19 are made by any of the usual techniques such as doctor blade, slip casting on a plastic film of polyethylene teryphthalate ("Mylar"), etc. The manner of forming the films is not critical.

After electroding, the green ceramic layers 18 and 19 are arranged one on top of the other as shown in FIG. 3, but with the lower surface of layer 19 in contact with the upper surface of layer 18 instead of being slightly separated as shown in FIG. 3. The layers are then wrapped around a mandrel producing the resultant structure shown in FIG. 6 which is fired to mature the ceramic and metal paints. During firing, the layers coalesce into a monolithic structure. The layer 19 is preferably longer than the layer 18 so that it may continue past the end 26 of the layer 18 and provide a seal. The electrode surface 16 is preferably applied in the form of a silver paint after the firing operation to produce a solderable surface. As shown in FIG. 6, there are a plurality of holes 24 and 25 distributed throughout and shorting the turns of the common electrode 23 (7) through the electrode 22. This provides non inductive current flow and improves the performance for high frequencies.

FIG. 8 is an enlarged view showing the metal paint establishing a path through the hole 25 in layer 19.

In the modification shown in FIG. 7, the green ceramic layer 18 is prepared in the same manner shown in FIG. 5 but with the electrode 22 and holes 24 omitted. The green ceramic layer 19 is prepared in the same manner shown in FIG. 4 but with the holes 25 omitted. The layers 18 and 19 are then arranged one on top of the other and wrapped to produce the structure shown in FIG. 6, but without the holes 24 and 25 and without the electrode 22. A fragmentary section of the finished capacitor at the end of the wrapping operation is shown in FIG. 7. In order to short the common ground electrode 7, either before or after firing, one or more holes 27 are drilled diametrically through the tube in the region between the ends of the electrodes 6, 8, or in other words, in the region occupied by the electrode 22 in FIG. 5. FIG. 7 shows two such holes 27 drilled on axes at 90° to each other. After firing, the edges of the electrode 23 (7) exposed by the drilled holes 27, are shorted by a conductive coating, usually a silver paste or paint. The holes 27 may mechanically weaken the capacitor as compared to the distributed holes 24, 25 in the capacitor shown in FIGS. 3–6 inclusive. FIG. 9 shows one of the holes 27 extending through a plurality of layers and the metal paint 28 shorting the turns of electrode 23.

As an example, but not by way of limitation, the outside diameter of the filter unit may be 0.10" and the length may be 0.50", the inside diameter of the tube may be 0.040" and the layers 18 and 19 may each have a thickness of 0.002".

If only a single capacitor is desired, one of the electrodes 6, 8 may be omitted and the resultant capacitor will have the turns of the electrodes shorted. This permits shorting of the electrode 7 without bringing the electrode to the edge of the dielectric. In the manufacture of such a capacitor, the electrode 21 on the layer 18 could be omitted.

What is claimed as new is:

1. A capacitor unit comprising an integral tubular ceramic monolith containing therein in superimposed relationship, a first electrode extending in spiral relation in a plurality of turns about the axis of and spaced axially inward from both ends of the tube, a second electrode disposed in generally parallel relationship to the first electrode but insulated therefrom by portions of said monolith, said second electrode extending in spiral relationship about the axis of the tube and extending axially inward from one end of the tube and in capacity relation to the first electrode, a third electrode disposed in generally parallel relation to the first electrode but insulated therefrom by portions of said monolith, said third electrode extending in spiral relationship about the axis of the tube and spaced axially from the second electrode, means for shorting the turns of the first electrode comprising holes extending between the turns of the first electrode and through the third electrode in the thickness direction in the space between the second electrode and the other end of the tube and conductive material in the holes, means for forming a first terminal connected to the first electrode, and means for forming a second terminal at said one end of the tube and shorting the turns of said second electrode.

2. The unit of claim 1 in which the holes between the turns of the first electrode extend in staggered relation from one turn of the first electrode to a portion of the third electrode and from a different portion of the third electrode to an adjacent turn of the first electrode.

3. The unit of claim 1 having in addition a fourth electrode disposed in generally parallel relation to the first electrode but insulated therefrom by portions of said monolith, said fourth electrode extending in spiral relationship about the axis of the tube and spaced axially from the second and third electrodes.

References Cited

UNITED STATES PATENTS

| | | | |
|---|---|---|---|
| 2,000,441 | 5/1935 | Given | 317—260 |
| 2,011,555 | 8/1935 | Burlingame | 317—260 |
| 2,053,334 | 8/1936 | Hetenyl | 317—260 |
| 2,190,430 | 2/1940 | Krambeer | 317—260X |
| 3,004,197 | 10/1961 | Rodriguez | 317—258 |
| 3,137,808 | 6/1964 | Coda | 317—242 |
| 3,329,911 | 7/1967 | Schlicke | 333—79 |
| 3,275,954 | 9/1966 | Coda | 333—79 |
| 3,081,439 | 3/1963 | Bennett | 333—31 |
| 3,259,818 | 7/1966 | Garstang et al. | 317—258 |
| 3,264,537 | 8/1966 | Delaney | 317—258 |

FOREIGN PATENTS

| | | | |
|---|---|---|---|
| 848,360 | 10/1939 | France | 317—260 |

ELLIOT A. GOLDBERG, Primary Examiner

U.S. Cl. X.R.

333—79